Patented Apr. 18, 1944

2,346,665

UNITED STATES PATENT OFFICE 2,346,665

ACID

Martin Eli Cupery, Wilmington, Del., assignor to E. I. du Pont de Nemours & Company, Wilmington, Del., a corporation of Delaware No Drawing. Application May 8, 1940,
Serial No. 334,068

14 Claims. (Cl. 260—500)

This invention relates to organic acids and more particularly to organic dihydroxamic acids.

This invention has as an object the preparation of new dihydroxamic acids. A further object is the preparation of new substances possessing improved metal deactivating properties. A still further object is the preparation of substances useful in the synthesis of diisocyanates and polyamides. Another object is the preparation of gasoline soluble materials. Other objects will become apparent in the description of the invention.

These objects are accomplished by the following invention which comprises dihydroxamic acids

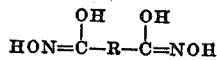

wherein the two

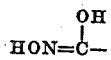

groups are separated by a chain of at least four atoms, and processes for preparing the same comprising reacting an ester of the corresponding dicarboxylic acid with hydroxylamine in the presence of an alkali at a temperature below the decomposition temperature of the hydroxylamine.

In the specification and claims the product is termed a dihydroxamic acid which is formulated as

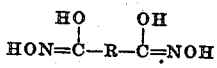

The term dihydroxamic acid and the formula

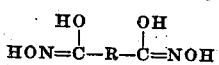

are, however, to be understood as including the tautomeric dihydroximic acids and hydroxamic acids

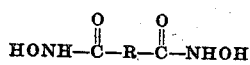

wherein one or both of the

groups tautomerize to

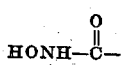

In the process of the present invention, a salt of a dihydroxamic acid is prepared by reacting, at temperatures below 100° C., an ester of a dicarboxylic acid having a chain of at least four atoms between the carboxyls with at least an equivalent amount of hydroxylamine in a liquid medium containing an equivalent amount of a basic substance in the form of a metal hydroxide or alcoholate, ammonia, or an organic base, and the hydroxamic acid is subsequently liberated from its salt by double decomposition with another acid.

The novel products of this invention—dihydroxamic acids having a chain of at least four atoms between the

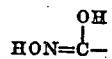

groups—have novel, unexpected and useful properties, among which the ability to deactivate metal ions is especially noteworthy.

The more detailed practice of the invention is illustrated by the following examples, wherein parts given are by weight. There are of course many forms of the invention other than these specific embodiments.

*Example I*

A methanol solution of hydroxylamine is prepared by adding a cool (20° C.) solution of 75.6 parts of sodium methylate in methanol to a solution of 77 parts of hydroxylamine hydrochloride in methanol. The precipitated sodium chloride is separated by filtration. To the filtrate is added 101 parts of diethyl adipate and a solution of 54 parts of sodium methylate in methanol. This reaction mixture is allowed to stand at 30° C. for 15 hours. It is then subjected to distillation under reduced pressure until the volatile constituents are substantially removed. The white, nearly dry, solid residue remaining (sodium salt of adipodihydroxamic acid) is then dissolved in 100 parts of warm water. After cooling this solution to 0° C., 99 parts of concentrated hydrochloric acid (specific gravity 1.19) is slowly introduced with stirring. The acidic solution is cooled to —5° C. to complete the precipitation of the product which is separated by filtration, washed with a little cold water, and dried. By this means there is obtained 65 parts of adipodihydroxamic acid, which is a crystalline white solid melting at 164° C. with decomposition, and which gives with ferric chloride solution the deep red coloration characteristic of hydroxamic acids in general.

*Example II*

A reaction mixture comprising a methanol solution of diethyl adipate, hydroxylamine, and sodium methylate, prepared as described in Example I, is evaporated substantially to dryness after the reaction has proceeded for 15 hours. The residue is then recrystallized four times from a mixture of 300 parts of water and 240 parts of methanol by successively dissolving the solid at 70° C. and causing it to crystallize out by cooling to 0° C. The four-times recrystallized sodium salt is dissolved in 100 parts of water, cooled to 0° C., and acidified with 54 parts of concentrated hydrochloric acid (specific gravity 1.19). The product which precipitates upon acidification is separated by filtration, washed with cold water, and dried. The 46 parts of adipodihydroxamic acid thus obtained have the melting point 164° C. with decomposition. The ultimate composition ascertained by analysis agrees with the expected composition within the usual limits of error.

*Analysis.*—Calculated for $C_6H_{12}O_4N_2$: N, 15.91%. Found (Dumas method): N, 15.63.

The constitution of this acid is further confirmed by the formation of derivatives, such as the diacetyl derivative (melting at 177.5° C.; prepared from the dihydroxamic acid and acetic anhydride.

*Analysis.*—Calculated for $C_{10}H_{16}O_6N_2$: N, 10.77. Found: N, 10.44.

and dibenzyl derivative (melting at 137° C.; prepared from benzyl chloride and a metallic salt of the dihydroxamic acid.

*Analysis.*—Calculated for $C_{20}H_{24}O_4N_2$: N, 7.87. Found: N, 8.13.

Example III

A reaction mixture comprising a methanol solution of diethyl sebacate (258 parts, hydroxylamine (72.6 parts), and sodium methylate (108 parts), prepared as described in Example I, is allowed to stand at 30° C. for two days. A stream of dry carbon dioxide gas is then passed through this solution until precipitation of sodium carbonate ceases. The solid is removed by filtration, and the methanol solvent evaporated from the filtrate. After drying, the residue comprises 175 parts of sebacodihydroxamic acid, which is a white solid melting with decomposition at 164° C.

*Analysis.*—Calculated for $C_{10}H_{20}O_4N_2$: N, 12.07. Found: N, 11.88.

Example IV

Crude adipodihydroxamic acid (60 parts) prepared as described in Example I is dissolved in water made faintly acid with acetic acid and added to a solution of 100 parts of cupric acetate monohydrate in water. The grass-green precipitate thus formed is filtered and washed with water, methanol, and ether in succession. After drying, this solid (74 parts; the copper salt of adipodihydroxamic acid) is thoroughly powdered and suspended in methanol. A stream of hydrogen sulfide gas is passed through the mixture until the precipitation of copper sulfide is complete. This precipitate is removed by filtration and the filtrate evaporated to dryness under reduced pressure. After recrystallization from mixtures of methanol and ethyl acetate, and methanol and benzene, 18 parts of adipodihydroxamic acid melting at 164° C. is obtained.

Example V

A solution of 235 parts of potassium hydroxide in 640 parts of methanol is added with stirring to a solution of 202 parts of diethyl adipate and 153 parts of hydroxylamine hydrochloride in 1280 parts of methanol. The precipitated potassium chloride is removed by filtration, and the resulting solution allowed to stand for 16 hours at 30° C. At the end of this time decantation of the methanol mother liquor leaves a solid residue (potassium salt of adipodihydroxamic acid). The addition of an equivalent amount of hydrochloric acid to an aqueous solution of this salt, as described in the foregoing examples, yields 103 parts of analytically pure adipodihydroxamic acid. An additional 34 parts of this acid approximately 80 per cent pure can be obtained by evaporating the methanol mother liquor nearly to dryness and acidifying an aqueous solution of the residue.

Example VI

A methanol solution of diethyl meta-phenylenedioxyacetate (282 parts) is added to a methanol solution of hydroxylamine (76 parts) and potassium hydroxide (112 parts). After storing this mixture at 25° C. for 16 hours, the white solid which precipitates is separated by filtration and washed with hot methanol. The solid is dissolved in water at about 50° C. and acidified with acetic acid. When the solution is cooled to 0° C., meta-phenylenedioxyacetohydroxamic acid precipitates in good yield. The product is filtered off, washed with ice water, and dried at 90° C. The yield of pure product melting with decomposition at 163–164° C. amounts to 290 parts which is equivalent to 93% of the theoretical.

*Analysis.*—Calculated for $C_{10}H_{12}O_6N_2$: N, 10.94. Found (Dumas): N, 10.77.

Example VII

A reaction mixture comprising 228 parts of diethyl hexahydroterephthalate, prepared by the catalytic hydrogenation of diethyl terephthalate, 73 parts of hydroxylamine and 108 parts of sodium methylate in 500 parts of methanol is allowed to stand at 25° C. for 19 days. The precipitate which is present at the end of this time is separated by filtration, dissolved in 400 parts of water and acidified to Congo red by the addition of concentrated hydrochloric acid (sp. gr. 1.19). When this solution is cooled to −5° C., a solid (66 parts dry weight) is precipitated. The product, hexahydroterephthalodihydroxamic acid, melts with decomposition at about 220° C. With ferric chloride in aqueous or alcoholic solution it gives the deep brownish-purple color characteristic of dihydroxamic acids.

Example VIII

A reaction mixture comprising 270 parts of diethyl beta-phenyladipate, 100 parts of hydroxylamine and 112 parts of potassium hydroxide dissolved in 1200 parts of methanol is allowed to stand at 25° C. for 7 days. To the resulting solution is added a solution of 200 parts of cupric acetate monohydrate in 2000 parts of water. The green copper salt thus precipitated is separated by filtration, washed thoroughly with water and hot methanol. It is then suspended in methanol and treated with a continuous stream of hydrogen sulfide gas until the copper is completely precipitated as copper sulfide, which is filtered off. The remaining methanol solution is evaporated to dryness under reduced pressure. The amorphous product is dried at 100° C. under 1 mm. pressure, giving 150 parts of beta-phenyladipodihydroxamic acid. With ferric chloride, this product gives the same color test as that of Example VII.

Example IX

A reaction mixture comprising 230 parts of diethyl beta-tertiary-amyladipate, 61 parts of hydroxylamine, 91.4 parts of sodium methylate and 2200 parts of methanol is allowed to stand at 25° C. for four days. To the resulting mixture is added a solution of 160 parts of cupric acetate monohydrate in 1700 parts of water. The green precipitate thus formed is separated by filtration and thoroughly washed with water and hot methanol. The beta-tertiary-amyladipodihydroxamic acid is isolated from the copper salt by the method described in Example VIII, as a gelatinous solid (60.4 parts), giving the characteristic color test with ferric chloride.

The foregoing examples illustrate the application of this invention to the preparation of certain specific dihydroxamic acids. The invention is, however, generic to the preparation of new and useful dihydroxamic acids by reaction of hydroxylamine in the presence of an equivalent of alkali with esters of dicarboxylic acids having a chain of at least four atoms between the carboxyl groups. The process does not seem to be generally applicable to esters of the lower dicarboxylic acid, since attempts to apply it to the diethyl ester of glutaric acid have failed. The invention is, however, applicable to the ester of any dicarboxylic acid having at least four atoms between the carboxyls including beta-methyladipic, alpha-ethyladipic, beta-isopropyladipic, beta-tert.-butyladipic, beta-tert.-amyladipic, beta-phenyladipic, beta-(p-hydroxyphenyl) adipic, beta-(p-mercaptophenyl) adipic, beta-(p-nitrophenyl)adipic, beta-(p-methoxyphenyl) adipic, alpha, gamma-dimethyladipic, 6-undecanonedioic, dodecanedioic, nitroterephthalic, beta-(p-aminaphenyl) adipic, hydroxyterephthalic, dicyclohexanone ketal of mucic acid, pimelic, suberic, azelaic, terephthalic, hexahydroterephthalic, methylimino - gamma,-gamma'-dibutyric — $CH_3N(CH_2CH_2CH_2CO_2H)_2$, 5-thianonanedioic — $S(CH_2CH_2CH_2CO_2H)_2$, and O,O'-ethyleneglycoldiacetic—

acids.

The alcohol with which the dibasic acid is esterified is not limited to ethanol but can be any alcohol such as methanol, propanol, isopropanol, butanol, isobutanol, tertiary butanol, phenol, or any of the isomeric amyl, hexyl, or octyl alcohols. In addition, the alcohol can be polyhydric. For example, glycol and glycerol esters can be employed. Thus, a linear polyester, such as ethyleneadipate, is an operable starting material. Mixed esters, i. e., compounds containing one each of two alcohol residues, can also be employed. As examples of mixed esters may be mentioned methyl ethyl adipate and ethyl butyl semacate.

The basic substance employed for the purpose of forming a dihydroxamic acid salt is not limited to the sodium methylate and potassium hydroxide disclosed in the foregoing examples. Other bases suitable for this purpose include sodium ethylate, potassium methylate, potassium ethylate, calcium ethylate, sodium hydroxide, barium hydroxide, ammonium hydroxide, anhydrous ammonia, organic bases such as mono-, di-, or trimethylamine, piperidine, and benzyltrimethylammonium hydroxide, in fact any base having a dissociation constant greater than $1 \times 10^{-6}$.

The process is not limited to any particular method of preparing a solution of hydroxylamine such as is illustrated in Example I. Thus, such a solution can also be prepared by treating an aqueous solution of hydroxylamine hydrochloride or hydroxylamine sulfate with sodium or potassium hydroxide, with sodium or potassium carbonate, or with calcium hydroxide. The method disclosed in Example I is preferred where it is desirable to conduct the reaction so that a dihydroxamic acid salt is formed in a substantially anhydrous medium, thereby facilitating the separation of the water-soluble dihydroxamic acid salt. In this instance methanol is preferred as a solvent and hydroxylamine hydrochloride as the hydroxylamine salt employed because of the conveniently high concentration of this salt which may be attained in methanol solutions. It is also unnecessary to free the hydroxylamine solution from inorganic salts before introducing therein the carboxylic acid ester. Thus, it is frequently desirable to mix a hydroxylamine salt with the ester in the proper medium and subsequently to introduce the basic material, which generates uncombined hydroxylamine by displacing it from its salt. In fact, the order in which the reactants are brought together is immaterial.

While the reaction of hydroxylamine with the dicarboxylic acid ester in the presence of a base to obtain a salt of a dihydroxamic acid is preferably conducted at ordinary temperatures during approximately 15 hours, other reaction conditions can be employed. For practical purposes, the upper temperature limit of the reaction is the boiling point of the reaction mixture; for example, ca. 70° C. in the case of methanol as a solvent. Under superatmospheric pressure, however, any temperature below the decomposition temperature of hydroxylamine, ca. 90–100° C., may be employed. At reaction temperatures above ordinary temperatures (ca. 30° C.), the velocity of the reaction is correspondingly increased. Thus, at 70° C. the reaction is substantially complete at the end of one hour. Temperatures below 30° C. are also feasible, providing a longer time is allowed for the process. Thus, at —10° C. a duration of one week is required for substantial completion of the reaction. In general, the reaction is allowed to proceed only as long as is necessary to effect substantially complete conversion to the dihydroxamic acid salt since side reactions may reduce the yield of the desired product if it is not isolated when its formation is complete. For example, if the reaction mixture is not completely anhydrous, hydrolysis of the carboxylic ester and also of the dihydroxamic acid may be brought about by the alkaline medium, especially when the reaction mixture is maintained at higher temperatures for long periods.

The proportions of the reactants may be varied widely without departing from the spirit of this invention. For practical purposes, however, the most economical use of the raw materials is obtained if at least an equivalent amount of hydroxylamine is employed per carboxylic ester group. The molecular proportion of hydroxylamine relative to the ester group can be in the ratio of 5:1 or higher but is preferably in the ratio of 1 to 1.5:1. The base employed is preferably stoichiometrically equivalent to the ester groups present. A larger proportion can be employed without deleterious effect, but a quantity smaller than the preferred amount results in incomplete conversion of the hydroxamic acid to its salt and decreases the yield of the desired product by an amount approximately proportional to the missing base. When the base used is a gas such as ammonia, whose solubility in the reaction medium may not be great, it is convenient to introduce it in the required amount as a continuous stream during the course of the reaction.

The process is not limited to any particular solvent. While the solvent need not be anhydrous and may indeed contain considerable amounts of water, an organic medium such as methanol is preferred. Other suitable organic solvents include ethanol, propanol, isopropanol, butanol, dioxane, and mixtures thereof. The amount of solvent used may also be varied. Preferably, although it is not essential, there is sufficient solvent to dissolve the reactants completely, and for convenience an excess is avoided, but larger quantities of solvent can be used successfully. Either superatmospheric or subatmospheric pressures may be employed, and the process requires no unusual conditions of illumination.

The process under consideration is not limited to any particular mode of freeing the hydroxamic acid from its salt. It is necessary only that (i) the acid with which a water-soluble hydroxamic acid salt is treated be a more strongly acidic substance than the hydroxamic acid itself, or that (ii) the reagent used in freeing the hydroxamic acid from its metal salt form an insoluble compound with the metallic ions present, thus removing them from the reaction. Since hydroxamic acids in general are very weakly acidic, the acid used in alternative (i) need not be strong. Acetic, propionic, adipic, phosphoric, or sulfuric acids can be used. In some cases even carbonic acid can be employed. Other combinations of reagents and hydroxamic acid salts which might be used under alternative (ii) include sulfuric acid with the calcium, barium, or lead salts of the hydroxamic acid, or carbonic acid (carbon dioxide) with the calcium or barium salt. Acids which exert a strong reducing or oxidizing action are to be avoided since they may destroy the hydroxamic acid. The temperatures employed in the liberation of the hydroxamic acid are preferably between 40° C. and 0° C. or lower. While higher temperatures can be employed, they are to be avoided, especially when strong acids are used, because a part of the desired product may be destroyed by hydrolysis.

An alternative procedure for preparing the dihydroxamic acid consists in reacting a dicarboxylic acid halide having a chain of at least four atoms between the acid halide, —COX, (X=halogen) groups at a temperature not higher than about 100° C. with at least an equivalent amount of hydroxylamine in a medium inert to the acid halide and preferably containing an acid acceptor such as pyridine.

This alternative procedure is likewise susceptible to numerous variations. Thus, the hydroxylamine, which can be prepared in the uncombined state either by fractional distillation or by freezing out from its alcoholic solution, can be used either in a solution or in suspension in an inert medium. The inert medium must be one which is unreactive toward the acid halide employed. As examples of such media may be mentioned ether, benzene, hexane, chloroform, carbon tetrachloride, dioxane, and the dimethyl ether of diethylene glycol. The reaction of the acid halide with hydroxylamine is usually vigorous and is preferably carried out at temperatures between 0° and 30° C. At these temperatures the reaction proceeds to completion within a few minutes. In order to avoid violent reaction, it is sometimes desirable to use temperatures as low as —50° C. and to allow a correspondingly greater time, say 10 hours, for the reaction to become complete. Higher temperatures are, however, not excluded and any temperature below the decomposition range of hydroxylamine, i. e., ca. 90–100° C., is operable.

While the proportions of the reactants may be varied, it is usually preferable to employ at least an equivalent amount of hydroxylamine per acid halide group. The molecular proportion of hydroxylamine relative to the acid halide group is usually 1 to 1.5:1 but can be considerably higher.

Although not absolutely necessary, it is usually desirable, when this alternative method is used, to have present in the reaction mixture an acid acceptor. Suitable acid acceptors, which may form addition compounds with the acid halides, but do not destroy them or render them unreactive toward hydroxylamine, are pyridine, quinoline, and dimethylaniline. The acid acceptors are usually employed in an amount equivalent to the acid halide but may be used in smaller or greater proportion.

The invention in its product aspect includes and is generic to dihydroxamic acids wherein the hydroxamic acid groups,

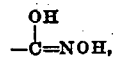

are separated by a chain of at least four atoms. These products have outstanding utility not only in chemical syntheses but also in the protection of organic compositions against oxidative decomposition catalyzed by metal ions. The following illustrate the utilization of products of this invention (a) in the synthesis of polymethylene diisocyanates, (b) in the synthesis of polyamides, and (c) in the stabilization of gasoline through metal deactivation.

(a) Sebacodihydroxamic acid suspended in xylene is treated with phosgene until it is converted to octamethylene diisocyanate boiling at 128 to 148° C. at 2 mm., which is identified by converting it to N,N'-diacetyloctamethylenediamine melting at 126° C. and to N,N'-octamethylenebis(ethyl urethane) melting at 77–79° C. Similarly adipodihydroxamic acid is converted by the action of thionyl chloride to tetramethylene diisocyanate, boiling at 86° to 118° C. under 3 mm. pressure, which is identified by converting it to N,N'-tetramethylenebisurea melting at 234° C.

(b) Sebacodihydroxamic acid is converted by heating in vacuo to a polyamide. Thus, 440 parts of sebacodihydroxamic acid is heated at a pressure of 2 mm. to 150° C. At this temperature, melting, accompanied by vigorous ebullition, occurs. After about 12 hours heating, the product is a brown solid (291 parts) melting, after purification by precipitation from methanol solution on cooling, at 140° C. and having the molecular weight 1050 (determined ebullioscopically in ethanol). On hydrolysis with strong hydrochloric acid, it yields sebacic acid and octamethylene-diamine.

(c) A blend of cracked and straight-run gasolines containing a copper compound and p-benzylaminophenol as an anti-oxidant is seriously impaired by the absorption of oxygen at 100° C. within 30 minutes. In a similar gasoline solution containing in addition 0.001 per cent of adipodihydroxamic acid, the deleterious effect of the copper compound is inhibited and the advantageous properties of the mixture are not substantially impaired within 440 minutes under identical conditions.

The process of the present invention is of utility in producing the products thereof which themselves have novel utility, e. g., in the metal-deactivation of gasoline. Lower dihydroxamic acids, e. g., malonodihydroxamic and succinodihydroxamic acids are not soluble in gasoline even to the extent of 0.0001% and hence do not have the outstanding utility of the products of the present invention. The latter may also be used to prepare higher diisocyanates which are of use in the treatment of textiles to obtain useful effects and to prepare linear polymeric polyamides.

The above description and examples are intended to be illustrative only. Any modification of or variation therefrom which conforms to the spirit of the invention is intended to be included within the scope of the claims.

What is claimed is:

1. An organic dihydroxamic acid wherein the two hydroxamic acid,

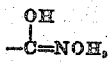

groups are separated by a chain of at least four carbon atoms.

2. An aliphatic dihydroxamic acid wherein the two hydroxamic acid,

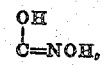

groups are separated by a chain of at least four carbon atoms.

3. Adipodihydroxamic acid.

4. Sebacodihydroxamic acid.

5. Process which comprises bringing an ester of a dicarboxylic acid wherein the esterified carboxyl groups are separated by a chain of at least four atoms in contact, in an inert liquid medium, with hydroxylamine in the presence of a base.

6. Process which comprises bringing an ester of a dicarboxylic acid wherein the esterified carboxyl groups are separated by a chain of at least four atoms in contact, in an inert liquid medium, with at least an equivalent amount of hydroxylamine in the presence of an equivalent amount of a base.

7. Process which comprises bringing an ester of a dicarboxylic acid wherein the esterified carboxyl groups are separated by a chain of at least four atoms in contact, in an inert liquid medium, with at least an equivalent amount of hydroxylamine in the presence of an equivalent amount of a base and in the presence of an inert organic solvent.

8. Process which comprises bringing an ester of a dicarboxylic acid wherein the esterified carboxyl groups are separated by a chain of at least four atoms in contact, in an inert liquid medium with at least an equivalent amount of hydroxylamine in the presence of an equivalent amount of a base and in the presence of an inert organic solvent at a temperature, below 100° C., at which the reaction mixture is fluid.

9. Process which comprises bringing diethyl adipate in contact, in an inert liquid medium, with hydroxylamine.

10. Process which comprises bringing diethyl sebacate in contact, in an inert liquid medium, with hydroxylamine.

11. Process which comprises bringing an ester of a dicarboxylic acid wherein the esterified carboxyl groups are separated by a chain of at least four atoms in contact, in an inert liquid medium with at least an equivalent amount of hydroxylamine in the presence of an equivalent amount of a base.

12. Process which comprises bringing an ester of a dicarboxylic acid wherein the esterified carboxyl groups are separated by a chain of at least four atoms in contact, in an inert liquid medium, with at least an equivalent amount of hydroxylamine in the presence of an equivalent amount of a base at a temperature, below 100° C., at which the reaction mixture is fluid.

13. An organic dihydroxamic acid wherein the two hydroxamic acid,

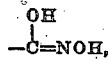

groups are separated by a carbon containing chain of at least four atoms, said chain being selected from the class consisting of carbon chains, carbon chains interrupted by ether oxygen, carbon chains interrupted by thioether sulfur, and carbon chains interrupted by tertiary amino nitrogen.

14. An aliphatic dihydroxamic acid wherein the two hydroxamic acid,

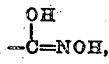

groups are separated by a carbon containing chain of at least four atoms, said chain being selected from the class consisting of carbon chains, carbon chains interrupted by ether oxygen, carbon chains interrupted by thioether sulfur, and carbon chains interrupted by tertiary amino nitrogen.

MARTIN ELI CUPERY.